United States Patent
Baum et al.

(10) Patent No.: US 6,952,835 B1
(45) Date of Patent: Oct. 4, 2005

(54) INTEGRATION OF PASSIVE DATA CONTENT IN A MULTIMEDIA-CONTROLLED ENVIRONMENT

(75) Inventors: Susan Baum, Foster City, CA (US); Tom Dizoglio, Boston, MA (US); Bhupesh Vyas, Sunnyvale, CA (US); Neal Bedard, Morgan Hill, CA (US); Ian MacDowell, San Francisco, CA (US)

(73) Assignee: Xperex Corporation, So. San Francisco, CA (US)

( * ) Notice: Subject to any disclaimer, the term of this patent is extended or adjusted under 35 U.S.C. 154(b) by 935 days.

(21) Appl. No.: 09/644,351

(22) Filed: Aug. 23, 2000

Related U.S. Application Data

(60) Provisional application No. 60/150,519, filed on Aug. 23, 1999.

(51) Int. Cl.$^7$ .............................................. H04N 7/173
(52) U.S. Cl. ......................... 725/110; 386/95; 386/126
(58) Field of Search ....................... 725/109, 110, 112, 725/134; 386/125–126, 124, 95, 96

(56) References Cited

U.S. PATENT DOCUMENTS

| | | | |
|---|---|---|---|
| 4,283,745 A * | 8/1981 | Kuper et al. .................. 386/52 |
| 5,590,056 A | 12/1996 | Barritz | |
| 5,666,293 A * | 9/1997 | Metz et al. .................. 725/152 |
| 5,818,935 A | 10/1998 | Maa | |
| 5,867,229 A * | 2/1999 | Stevens .......................... 386/4 |
| 5,982,445 A | 11/1999 | Eyer et al. | |
| 5,987,525 A | 11/1999 | Roberts et al. | |
| 5,991,798 A | 11/1999 | Ozaki et al. | |
| 5,991,799 A | 11/1999 | Yen et al. | |
| 6,061,796 A * | 5/2000 | Chen et al. .................. 380/283 |
| 6,169,843 B1 * | 1/2001 | Lenihan et al. ............. 370/394 |
| 6,363,204 B1 | 3/2002 | Johnson et al. | |
| 6,580,870 B1 | 6/2003 | Kanazawa et al. | |
| 2002/0007493 A1 | 1/2002 | Butler et al. | |

FOREIGN PATENT DOCUMENTS

| | | |
|---|---|---|
| EP | 0 837 599 A2 | 4/1998 |
| EP | 0 982 947 A2 | 3/2000 |
| GB | 2 327 837 A | 2/1999 |
| WO | WO 98/48566 | 10/1998 |
| WO | PCT/US 01/26249 | 8/2001 |
| WO | PCT/US 01/26248 | 2/2002 |

* cited by examiner

Primary Examiner—Vincent Boccio
(74) Attorney, Agent, or Firm—Blakely, Sokoloff, Taylor & Zafman LLP

(57) ABSTRACT

A device and method for integrating passive data content into multimedia content-controlled environment is described. According to one embodiment of the present invention, a device is coupled to a server through a network. The device includes a storage memory that includes a number of text sections. Additionally, the server can update the plurality of text sections through the network. The device also includes a Digital Versatile Disc (DVD) drive coupled to the storage memory. The DVD drive plays a DVD, wherein the DVD includes video content. Moreover, a number of time codes are associated with positions in the video content. The DVD drive includes a register that includes a register value. Further, the DVD drive includes a table having a number of table entries, wherein each table entry includes one of a number of register values, one of the number of time codes and an address. Each address is associated with one of the plurality of text sections.

52 Claims, 9 Drawing Sheets

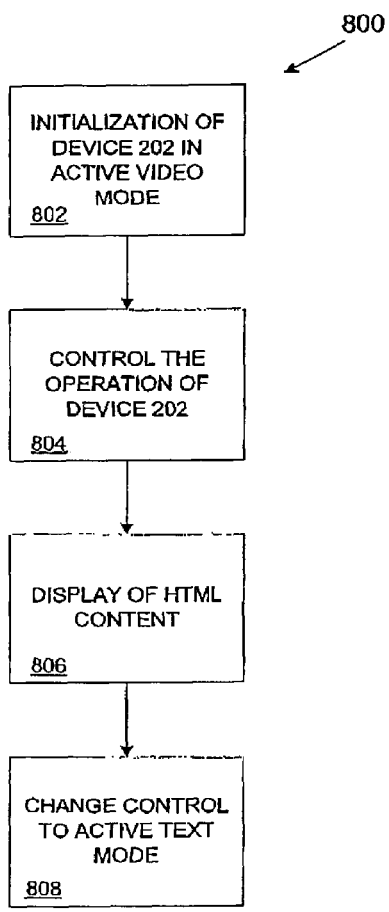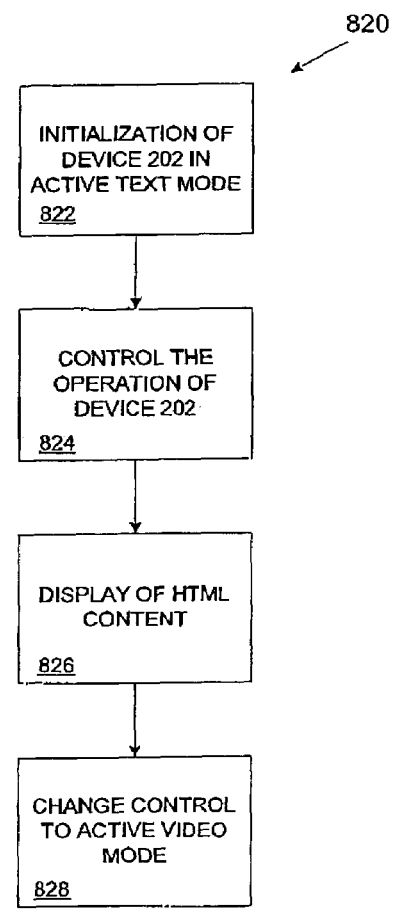
FIG. 8a
FIG. 8b

INTEGRATION OF PASSIVE DATA CONTENT IN A MULTIMEDIA-CONTROLLED ENVIRONMENT

This is a continuation of U.S. Provisional Patent Application No. 60/150,519, entitled "Essentially Managed Wireless Information Terminal and Network filed Aug. 23, 1999.

FIELD OF THE INVENTION

The invention relates to digital versatile discs (DVDs). More specifically, the invention relates to a system and a method for integration of passive text in a DVD-controlled environment.

BACKGROUND OF THE INVENTION

With the advent of the DVD in conjunction with the Internet, systems have been developed that attempt to synchronize the video content from a DVD-Video with Hyper-Text Markup Language (HTML) text from the Internet. One application of such a system, which can be displayed on a computer monitor or a television screen, could be a movie being displayed from the DVD-Video, while an Internet browser application displays HTML text, which could include subtitles or background information related to the movie.

One example of such a system is the WebDVD system by MICROSOFT®. FIG. 1 illustrates a monitor screen of a WebDVD system. In particular, FIG. 1 illustrates computer monitor screen 100 that includes DVD screen 104 and Internet browser screen 106. Additionally, computer monitor screen 100 is attached to a computer (not shown), which includes a DVD drive (not shown). In addition to video content, a DVD-Video includes text sections for different usages. The WebDVD system inserts Uniform Resource Locator (URL) addresses associated with different web content located on the Internet into these text sections of a particular DVD-Video. In operation, the DVD drive displays the video content located thereon onto DVD screen 104. Moreover, when the DVD disc drive encounters a URL address, the drive transmits this address to an Internet browser application running on the computer. Subsequently, the Internet browser application retrieves the HTML text associated with this URL address and displays such content in Internet browser screen 106.

However, such systems suffer from limitations. One such limitation is the lack of a tight integration between the video content from the DVD-Video and the HTML content from the Internet, due in part to the design of a DVD-Video, as the number of text sections to place the URL addresses therein on a given DVD-Video is limited. Accordingly, updates to Internet browser screen 106 may not be able to occur as frequently as some applications need or desire.

Moreover, such systems lack a full integration between the video content from the DVD-Video and the HTML content from the Internet. In particular as illustrated in FIG. 1, computer monitor screen 100 includes two separate windows to display the video content and the HTML content.

A further limitation in such a system is that the URL address is burnt onto the DVD-Video, thereby precluding any dynamic modification of such addresses. Therefore if a given URL address stored on the DVD-Video needs to be modified, a new DVD-Video must be created to include this modification. Accordingly, these types of modifications can be costly and time-consuming.

In another system that synchronizes video content from a DVD-Video with HTML text, the sector numbers of the DVD-Video are employed to provide for such synchronization. In such a system, numbers of the sectors containing the video content of the DVD-Video are associated with certain HTML text. Accordingly, video is displayed such that when certain sectors of the DVD-Video are played by the DVD drive, HTML text is displayed in a separate window for the number for the given sector. However, such a system also suffers from certain limitations. One such limitation is due in part to the modification of the sector locations on a DVD-Video each time a DVD-Video is burnt. Accordingly, the association between the sector numbers and the HTML text needs to be modified each time a DVD-Video is created.

SUMMARY OF THE INVENTION

A device and method for integrating passive data content into multimedia content-controlled environment is described. According to one embodiment of the present invention, a device is coupled to a server through a network. The device includes a storage memory that includes data content. Additionally, the server can update the data content through the network. The device also includes a Digital Versatile Disc (DVD) drive coupled to the storage memory. The DVD drive plays a DVD, wherein the DVD includes video content. Moreover, a number of time codes are associated with positions in the video content. The DVD drive includes a register that includes a register value. Further, the DVD drive includes a table having a number of table entries, wherein each table entry includes one of a number of register values, one of the number of time codes and an address. Each address is associated with one of the data content stored in the storage memory.

According to one aspect of the invention, a method includes monitoring a value of a register of a multimedia drive, wherein the multimedia drive includes video content. Additionally, the method includes locating the value in a table of register values, upon determining that the value has changed. The table includes a number of table entries with each table entry including a register value, an associated address and an associated time code. Moreover, each time code corresponds to a position within the video content that is included in the multimedia disc. The method also includes locating data content based on the address and integrating the data content with the video content based on the time code associated with the value of the register.

Another embodiment of the invention includes a method for integrating video from a DVD with markup language text. The method includes playing video content, by a DVD drive, from the DVD. Additionally, the method includes setting a register in the DVD drive to a register value upon executing a pre-/post-command sequence on the DVD, wherein the register value is associated with a time code and a Uniform Resource Locator (URL) address in a table. Moreover, the register value, the associated time code and the associated URL address are dynamically configurable via communication from a remote server coupled to the DVD drive.

BRIEF DESCRIPTION OF THE DRAWINGS

Embodiments of the invention may be best understood by referring to the following description and accompanying drawings which illustrate such embodiments.

In the drawings:

FIGS. 8a–8b are flowcharts illustrating methods for the setting and changing of the control mode, according to embodiments of the present invention.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

System Embodiments

Figure 1:
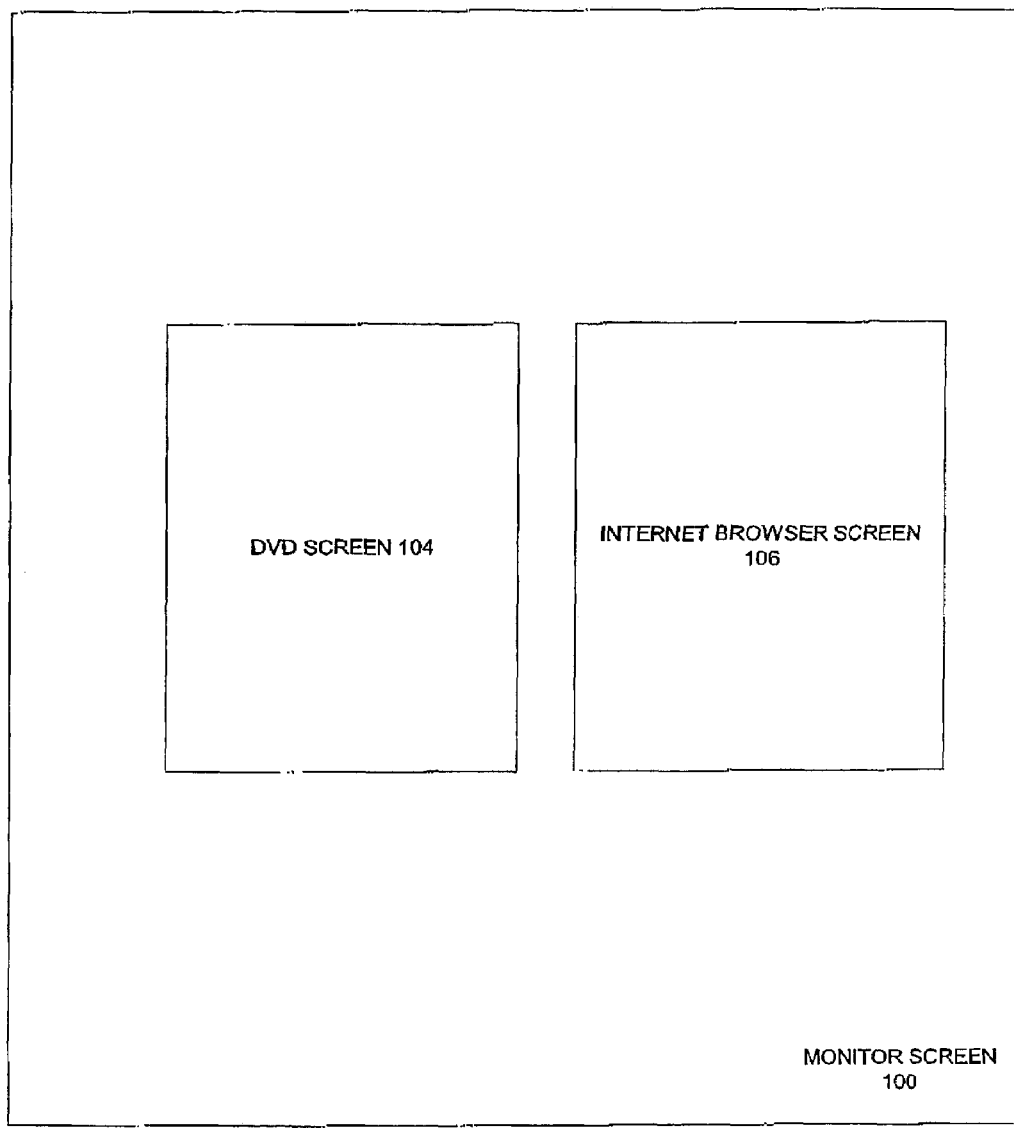
FIG. 1 illustrates a monitor screen of a WebDVD system.
Figure 2:
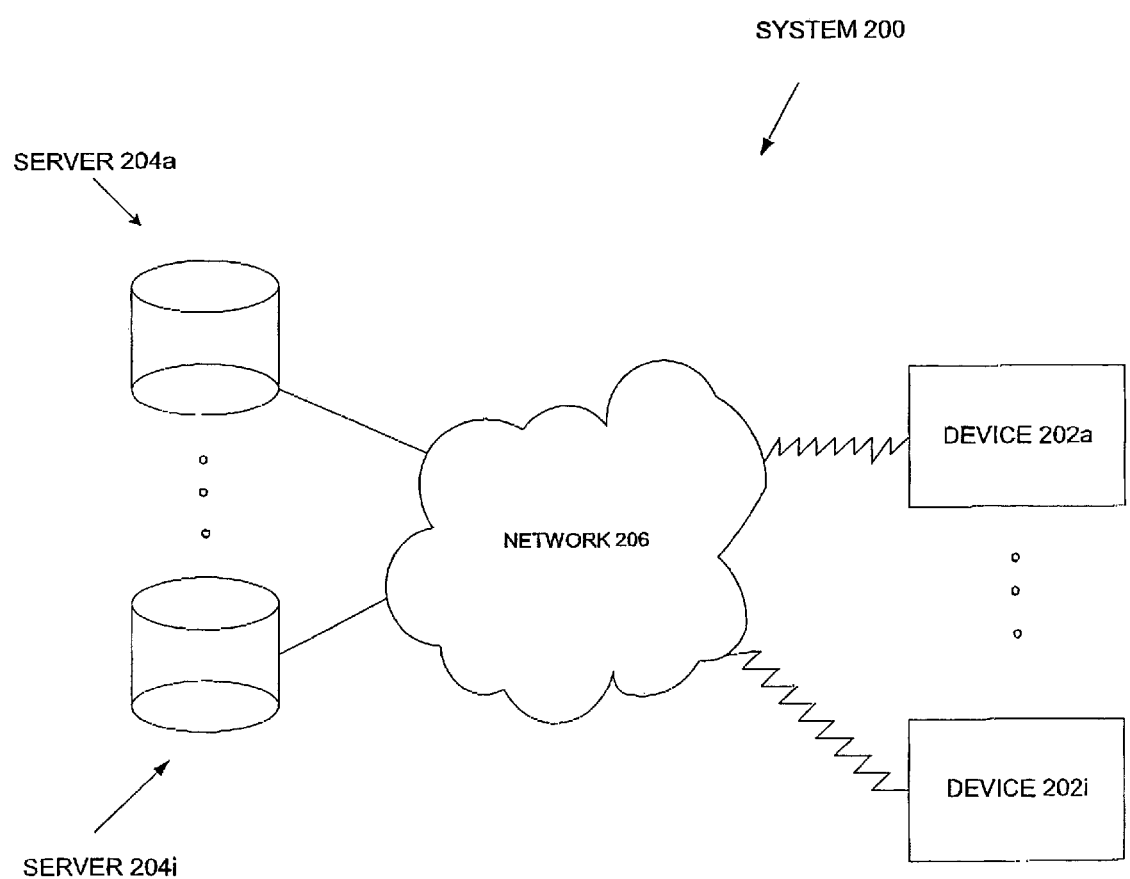
FIG. 2 is block diagram illustrating a system that incorporates embodiments of the present invention.

FIG. 2 is block diagram illustrating a system that incorporates embodiments of the present invention. In particular, FIG. 2 illustrates system 200 that includes devices 202a–i and servers 204a–i, which are coupled together through network 206. Devices 202a–i can include one to any number of such devices in system 200. Similarly, servers 204a–i can include one to any number of such servers in system 200. In an embodiment, there is a one-to-many relationship between a given server 204 and multiple devices 202. For example, devices 202a–c communicate exclusively with server 204a. However, embodiments of the invention are not so limited. For example, in another embodiment, there is a one-to-one relationship between a given server 204 and a given device 202. In a further embodiment, there is a many-to-one relationship between multiple servers 204 and a given device 202.

While different embodiments of the present invention could have different types of communication protocols between devices 202a–i and servers 204a–i, in an embodiment, the communication protocol between devices 202a–i and servers 204a–i is the HyperText Transfer Protocol (HTTP). Moreover, in one such embodiment, the communication protocol is upgraded to Secure-HyperText Transfer Protocol (HTTPS) to allow for increased security between devices 202a–i and servers 204a–i.

In one embodiment, network 206 is a local area network (LAN). In another embodiment, network 206 is a wide area network (WAN). In one such embodiment, network 206 is the Internet. Further, network 206 can be a combination of different networks that provide communication between servers 204a–i and devices 202a–i. While different embodiments could have different types of communication between network 206 and servers 206a–i and devices 202a–i, in one embodiment, devices 202a–i are coupled to network 206 through wireless communication, while servers 204a–i are coupled to network 206 through wired communication. Moreover, to allow for increased security regarding the communications between devices 202a–i and servers 204a–i, virtual private networks (VPNs) within network 206 can be established between a given device 202 and a given server 204.

Figure 3:
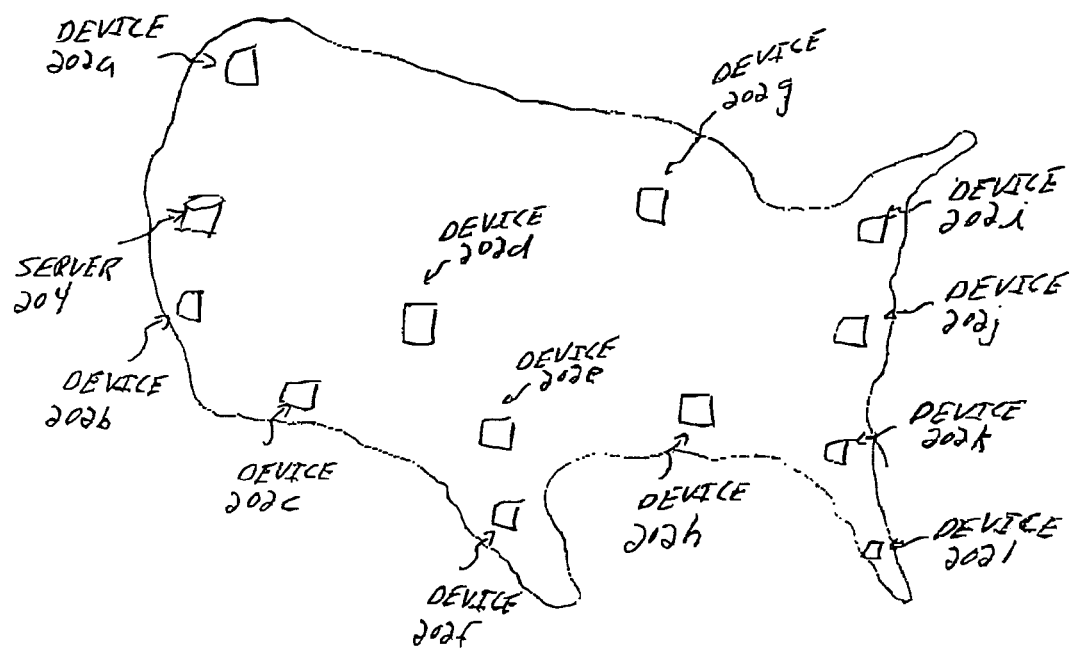
FIG. 3 illustrates one application of system 200, according to embodiments of the present invention.

FIG. 3 illustrates one application of system 200, according to embodiments of the present invention. In particular, FIG. 3 illustrates a map of the United States wherein server 204 and devices 202a–l are located in different locations across the United States. Additionally not shown for the sake of clarity, server 204 and devices 202a–l are coupled together through different networks, such as WANs and/or LANs. In operation, server 204 communicates with devices 202a–l. Such communication includes the downloading of data content and configuration data into devices 202a–l, to allow for the overlaying of such data content onto a video content, which can be stored locally on multimedia discs, such as DVDs, within devices 202a–l. Data content is defined to include any type of data. Examples of such data include alphanumeric text, still and motion video content, audio content or any other type of data that is modifiable and can be downloaded into devices 202a–l. Moreover, communication between server 204 and devices 202a–l includes the uploading of status information; such as the title of the multimedia disc within multimedia drive 502, from devices 202a–l to server 204.

The application illustrated in FIG. 3 is by way of example and not by way of limitation, as embodiments of system 200 could be incorporated into other types of geographical locations while having different configurations. For example, system 200 could be incorporated into a global network spanning across different countries. In a further example, system 200 could include multiple servers 204 communicating with multiple devices 202.

In one embodiment, devices 202a–l are devices that include digital storage drives, such as multimedia drives, that can be employed as in-store user terminals for Point-Of-Purchase (P-O-P) retail advertising and promotion networks. Examples of a digital storage drive include a DVD drive. Additionally, other applications of devices 202 could include the placement such devices in airports, malls, etc.

Figure 4:
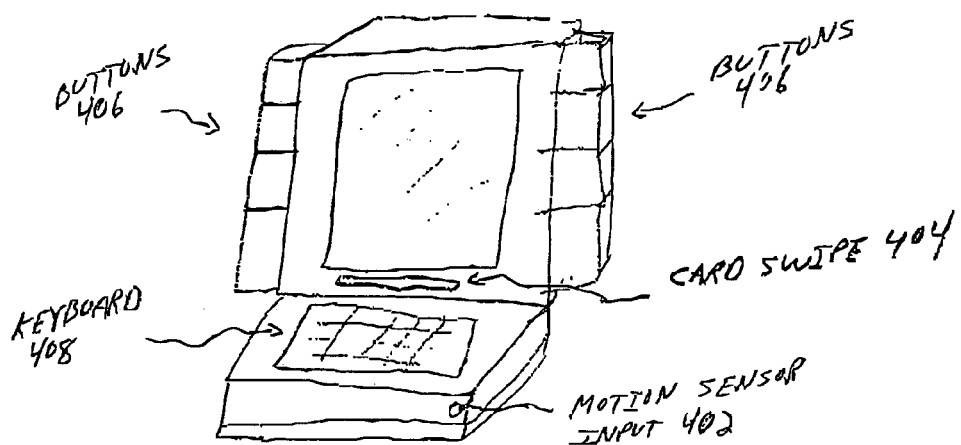
FIG. 4 illustrates device 202 and its associated user inputs, according to one embodiment of the present invention.

FIG. 4 illustrates device 202 and its associated user inputs, according to one embodiment of the present invention. In particular, as shown, the associated user inputs include motion sensor 402, card swipe 404, buttons 406 and keyboard 408. In an embodiment, motion sensor 402 is employed to detect movement within a certain range of devices 202, thereby causing its activation. For example, devices 202 could remain in an idle mode until motion is detected, which then begins a presentation to attract the user to devices 202. Such a presentation could include a video such as a talking head, which encourages the user to come closer to device 202 to watch the presentation.

Card swipe 404 is used to receive credit card data by having the user slide their credit card through card swipe 404. However, embodiments of the present invention are not limited to the receipt of credit card information. For example, in another embodiment card swipe 404 could also be employed to receive a user's information, such as the user's name and address, from a membership club card. Buttons 406 can be used for various user input data, such as the answering of multiple-choice type questions by the user. For example, the presentation of devices 202 may include asking the user personal information such as the user's gender or age group, wherein buttons 406 are associated with different answers to such questions. Moreover, keyboard 408 allows the user to enter alphanumeric data into devices 202, such as the user's name, address, credit card number, etc. The user inputs illustrated in FIG. 4 are by way of example and not by way of limitation as different, fewer, more and/or other user inputs could be included in device 202. For example, in one embodiment, a microphone could be employed to receive audio data from the user, which may be converted to digital data using voice recognition technology within device 202.

In one embodiment, devices 202 store high-bandwidth media, such as video, locally on a multimedia disc (e.g., DVD) therein, while allowing for low-bandwidth media to be updated from server 204 through a network connection. Examples of such low-bandwidth media includes data content concerning the latest product information or sales promotion for a product being sold in the given retail store. As another example, this data content can include promotional information for a sale on a product for a limited duration in order, for example, to move stagnant inventory within the store where device 202 is located. As another example, this text can include warning label information regarding a particular product.

Accordingly, server 204 can download different data content to different devices 202 to meet a store's specific needs and/or updates to information regarding a particular product. Moreover, this network connection between server 204 and devices 202 also can enable end-users to make purchases of products directly from devices 202, as purchases requests are uploaded to the remote server from such devices. Accordingly, for the end-user (e.g., retail store customer and/or sales clerk), devices 202 provide a responsive, up-to-date, easy-to-use interactive experience with the additional benefit of high-quality full motion video. In particular, a given device 202 can be dedicated to a given vendor's product or set of products. Accordingly, device 202 can provide an integrated multimedia product presentation, sales promotion and/or allow for e-commerce transactions for given products of the particular vendor.

In an embodiment, high-bandwidth media can also be downloaded from server 204 into memory of device 202, instead of being stored on a multimedia disc. In one such embodiment, this high-bandwidth media is downloaded during off-peak times of usage of device 202. For example, such media can be downloaded when the store wherein device 202 is located is closed.

Figure 5:
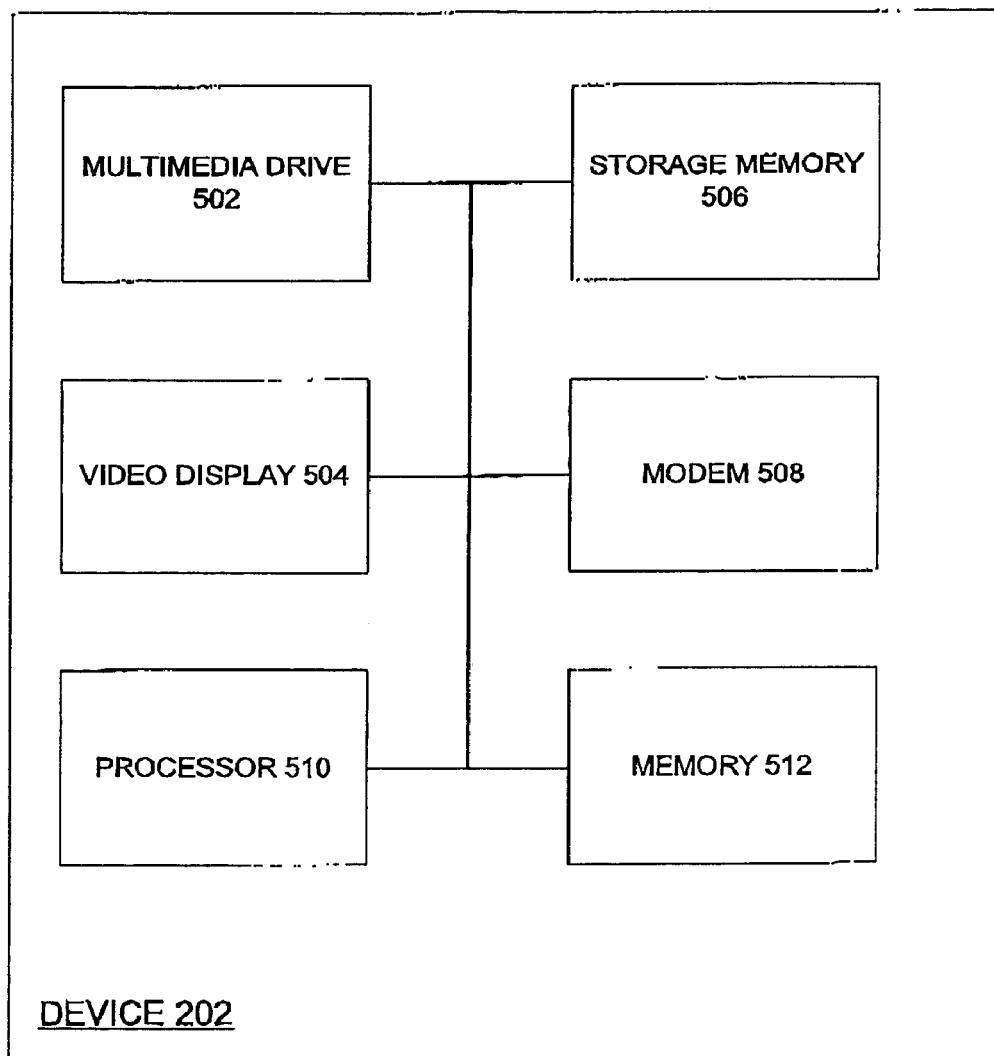
FIG. 5 illustrates a more detailed block diagram of devices 202a–i, according to embodiments of the present invention.

FIG. 5 illustrates a more detailed block diagram of the hardware components of devices 202, according to embodiments of the present invention. As shown in FIG. 5, in one embodiment, device 202 includes multimedia drive 502, storage memory 506, video display 504, modem 508, processor 510 and memory 512, which are all coupled together.

Multimedia drive 502 includes a fixed storage media, such as a DVD. In such an embodiment, multimedia drive 502 is a DVD drive. However, embodiments of the present invention are not so limited. For example, in other embodiments, multimedia drive 502 could be a Compact Disc-Read Only Memory (CD-ROM) drive, which reads a CD-ROM. Moreover, storage memory 506 can be various types of memory. In one embodiment, storage memory 506 is a dynamic storage media that can be updated (e.g., static random access memory, FLASH, a magnetic disc, etc.). In one such embodiment, storage memory 506 is a FLASH memory. In an embodiment, device 202 is shipped to a given location such that storage memory 506 does not include data. Accordingly, when device 202 is coupled to network 206, communications is established between device 202 and server 204 wherein server begins downloading data content into storage memory 506, which is described in more detail below. In one embodiment, the fixed storage media being read by multimedia drive 502 is larger in size than the dynamic storage media of storage memory 506.

With regard to modem 508, this device can be a landline modem or a wireless modem. In an embodiment where modem 508 is a wireless modem, the Cellular Digital Packet Data (CDPD) communication standard is employed. Moreover, this device is termed and described as a modem. However, embodiments of the present invention are not so limited, as this device could be any other type of wired or wireless network connection device. For example, in one embodiment this device could be a communication device to connect to a Digital Subscriber Line to couple to network 206.

Processor 510 can be any of a variety of different types of processing units. In one embodiment, processor 510 is an embedded microprocessor internal to device 202. Moreover, memory 512 can be a variety of different types of memories. In one embodiment, memory 512 is a random access memory (RAM). However, embodiments of the invention are not so limited as memory 512 can be other types of memory. These components of device 202 are described in further detail in conjunction with the software controlling such components in FIGS. 6a–6b below.

Figure 6A:
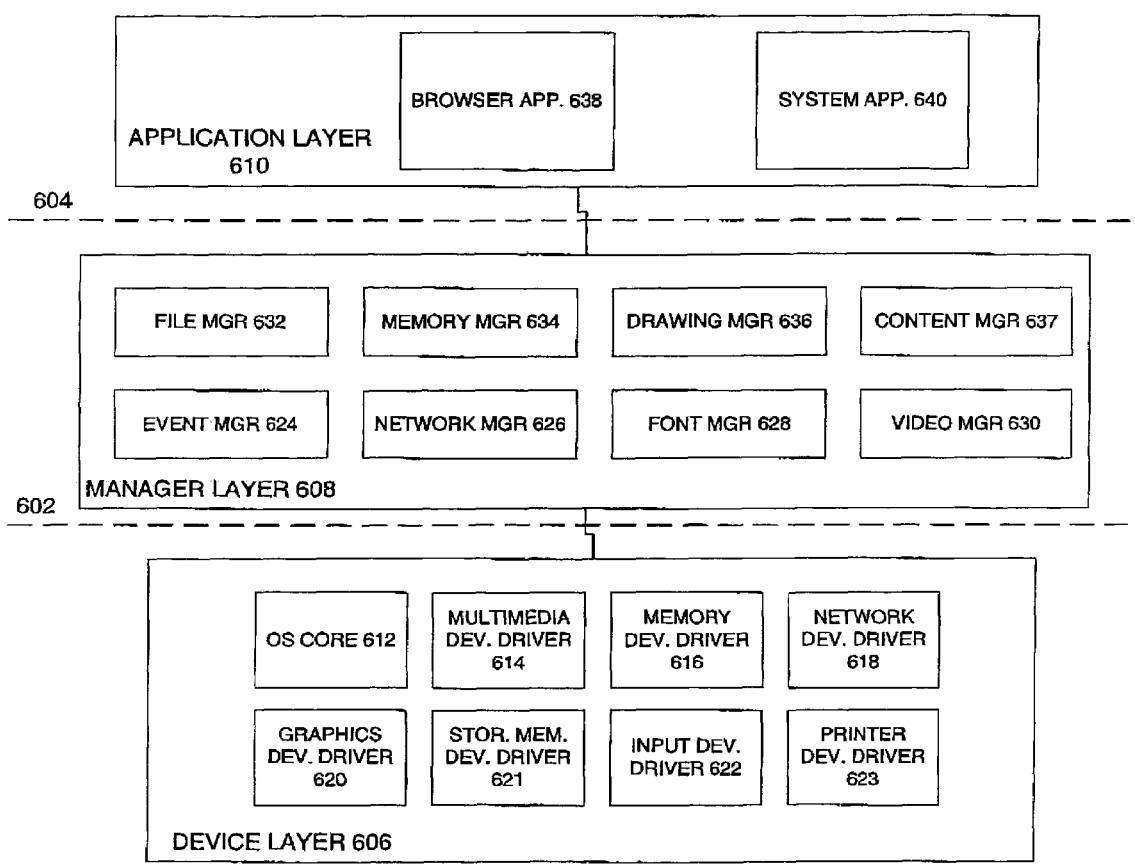
FIGS. 6a–6b illustrate a more detailed diagram of the software residing in memory 512 and executing on processor 510.

In particular, FIG. 6a illustrates a more detailed diagram of the software residing in memory 512 and executing on processor 510. Table 1 below identifies the software with respect to the dashed lines in FIG. 6a.

TABLE 1

| Dashed Lines | Software |
| --- | --- |
| Below 602 | Device Layer 606 |
| Between 602 and 604 | Manager Layer 608 |
| Above 604 | Application Layer 610 |

As illustrated in FIG. 6a, the software of device 202 includes three layers: (1) device layer 606, manager layer 608 and application layer 610. Device layer 606 operates the system code. This layer includes operating system (OS) core 612, multimedia device driver 614, memory device driver 616, network device driver 618, graphics device driver 620, storage memory device driver 621, input device driver 622 and printer device driver 623. These device drivers control and communicate with the hardware components of device 202 including those illustrated in FIG. 5. Moreover, the software in device layer 606 communicates with the software residing in manager layer 608. Accordingly, one function of device layer 606 is to act as a conduit through which the upper software layers communicate with the hardware of device 202.

Multimedia device driver 614, memory device driver 616, network device driver 618, graphics device driver 620, storage memory device driver 621, input device driver 622 and printer device driver 623 control and communicates with multimedia drive 502, memory 512, modem 508, video display 504, storage memory 506, user inputs (like those shown in FIG. 4) and a printer coupled to device 202 (not shown), respectively. The device drivers of device layer 606 are described in further detail in co-filed/co-pending application, titled "Distributed Publishing Network" to Jason Goldberg, Tim Fredenburg and Larion Vasilovsky, which is hereby incorporated by reference.

Manager layer 608 includes system software managers: (1) event manager 624, (2) network manager 626, (3) font manager 628, (4) video manager 630, (5) file manager 632, (6) memory manager 634, (7) drawing manager 636 and content manager 637. These software managers are device or hardware independent with standard functions for communication with the software in device layer 602 and application layer 610. These system software managers are described in further detail in co-filed/co-pending application, titled "Distributed Publishing Network" to Jason Goldberg, Tim Fredenburg and Larion Vasilovsky.

Additionally, application layer 610 includes browser application 638 and system application 640. Browser application 638 is an application operating on device 202 that provides for the communication with server 204. In one embodiment, a digital certificate is employed in the communications between device 202 and server 204 for added security.

System application 640 provides several functions for device 202. One such function includes the collecting and compiling of system information of device 202, which is subsequently transmitted to server 204 through browser application 638. Types of system information collected by system application 640 include debugging or performance data to enable the remote debugging of devices 202 from server 204.

Moreover, system application 640 monitors a port that is coupled to network 206. In particular, system application 640 monitors this port for messages from server 204. One such message from server 204 includes a message to have device 202 contact server 204. Upon receipt of such a contact message, system application 640 transmits a message to browser application 638, which causes browser application 638 to set up a network connection between device 202 and server 204 for the receipt of new data.

In one embodiment, system application 640 monitors the date and time of device 202 and compares these data to a callback value, which has been passed in from server 204 as part of the system and configuration data. When the callback value matches the date and time of device 202, system application 640 communicates to browser application 638 to set up a communication link between device 202 and server 204. Accordingly, this callback value allows for periodic uploads and downloads between device 202 and server 204.

Moreover, in an embodiment, device 202 operates in different control modes, thereby allowing a different process within device 202 to control the operation of device 202. In one such embodiment, device 202 includes two control modes: (1) active video mode and (2) active text mode. While in the active video mode and the active text mode, content manager 637 and browser application 638 control device 202, respectively. Accordingly, content manager and browser application 638 provides for the integration of the data content, which is downloaded from server 204 and stored in storage memory 506, with the video content from multimedia drive 502, which is described in further detail below as well as in co-filed/co-pending application, titled "Method and Apparatus for Overlaying HTML Content over Video Content" to Jason Goldberg and Tim Fredenburg, which is hereby incorporated by reference.

Further, the process in control controls the other hardware components and associated software components. For example, the process in control receives and processes the user inputs from the different input components of device 202. This operation in different control modes as well as which process internal to devices 202 receives and processes user input to devices 202 is described in more detail below.

Figure 6B:
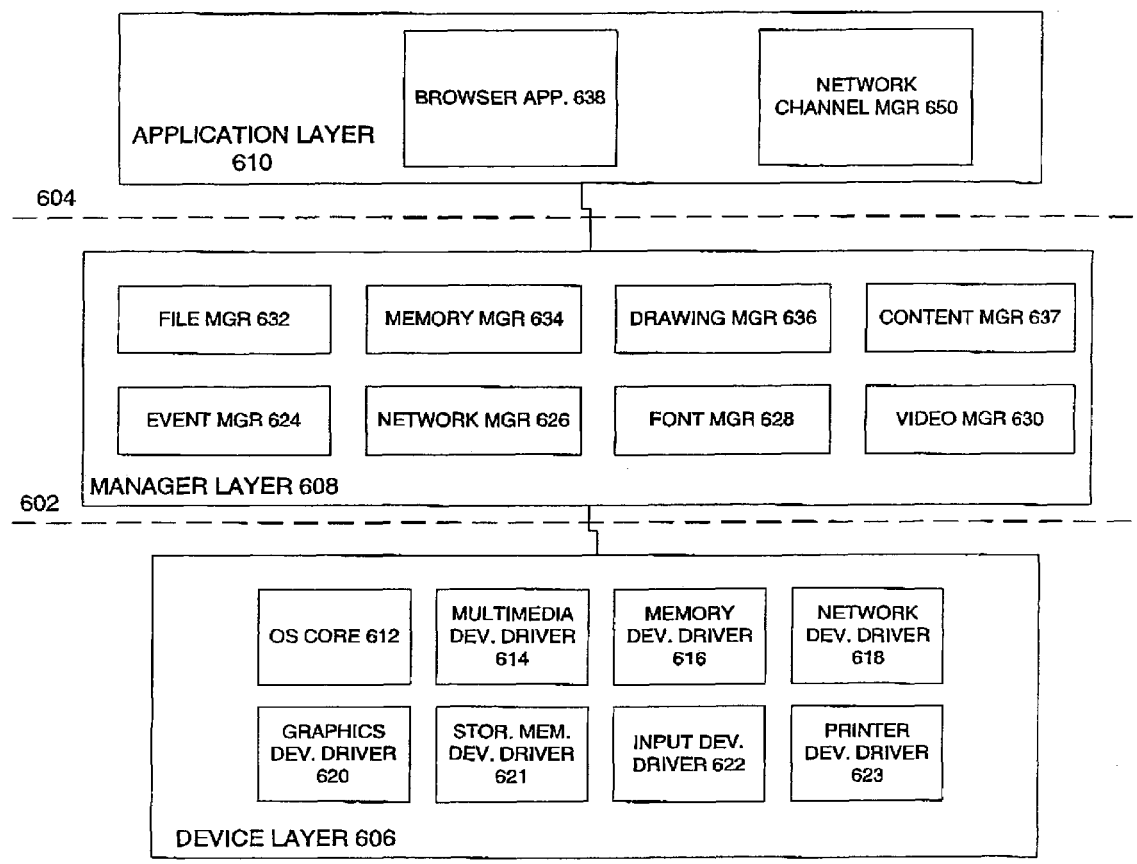

FIG. 6b illustrates an alternative embodiment of a more detailed diagram of the software residing in memory 512 and executing on processor 510. In particular, the embodiment illustrated in FIG. 6b includes similar software components as those illustrated in FIG. 6a. However as shown, the embodiment of FIG. 6b includes network channel manager 650 in substitution of system application 640. Moreover, as will be described in more detail in co-filed/co-pending application, titled "Distributed Publishing Network" to Jason Goldberg, Tim Fredenburg and Larion Vasilovsky, modifications are made to the existing software components. In particular, network channel manager 650 provides a channel-based interface with server 204 for the communications between device 202 and server 204. A channel is defined to include a communication stream between device 202 and server 204 and is associated with a given input/output port of device 202 and 204.

In one such embodiment, multiple channels can be established between device 202 and server 204 such that each channel is dedicated to a particular communication. For example, one channel could be responsible for delivering usage statistics from device 202 to server 204, thereby allowing data mining concerning the usage patterns of users of device 202. Another example of a channel to be established between device 202 and server 204 could be a control/status channel that allows server 204 to control device 202 as well as request status therefrom. For example, server 204 could employ a control/status channel to update the time of day, the date, etc. Another type of channel that can be established between device 202 and server 204 is a content update channel, which allows server 204 to deliver updated and/or new data to device 202. The above-described channels are by way of example and not by way of limitation, as other types of channels can be established between device 202 and server 204. For example, an error channel can be established between device 202 and server 204. Such a channel enables device 202 and/or server 204 to communicate to each other concerning errors occurring therein. Network channel manager 650 along with the above-described channels is described in more detail in co-filed/co-pending application, titled "Distributed Publishing Network" to Jason Goldberg, Tim Fredenburg and Larion Vasilovsky.

Returning to FIG. 2, system 200 includes servers 204a–i. Servers 204a–i store data content in a local directory structure, which can be downloaded into devices 202. Such data content, which can be downloaded from other servers and storage devices coupled to network 206, can include different types of markup language (i.e., presentation language) which includes command sequences embedded into the text. One example of such markup language is HTML.

In particular, servers 204a–i also include applications that retrieve the data content and files from other servers and storage devices coupled to network 206, as described above. Servers 204a–i are described in further detail in co-filed/co-pending application, titled "Distributed Publishing Network" to Jason Goldberg, Tim Fredenburg and Larion Vasilovsky. For example, the HTML content could be product information downloaded from a specific vendor's website. In one embodiment, this HTML content is modified for integration into the video content stored locally within device 202. Additionally, servers 204a–i include a database to store system and configuration data that has been uploaded from devices 202. For example, such system and configuration data could include the current data content that has been downloaded into device 202, debugging data and/or the title of the multimedia disc being played by multimedia drive 502. Moreover, servers 204*a–i* also include Common Gateway Interface (CGI) scripts, which are executed by processes on both devices 202 and servers 204 to allow for the downloading of data content into devices 202 as well as the uploading of data from devices 202.

Integration of Video Content and Data Content

In an embodiment, the video content from multimedia drive 502 is integrated with the data content from storage memory 506 through the use of command sequences located on a DVD being played by multimedia drive 502. In particular, a pre-command sequence and a post-command sequence are located before and after each unit of data on a DVD, respectively. In one embodiment, these units of data for the DVD that are located in devices 202 are video content. When a given DVD is being created, data can be placed into these units as well as into the pre-command sequence and the post-command sequence. According to one embodiment of the present invention, the pre-command sequence(s) and/or the post-command sequence(s) are employed to store in one or more of the General Program (GPRM) data registers different values within multimedia drive 502 when the DVD is being played within multimedia drive 502. This setting of a given data register is used as a signal to a separate process within device 202, which is more fully described below. Moreover, a pre/post-command sequence is defined such that each sequence can include one to any number of commands.

Figures 7A, 7B:
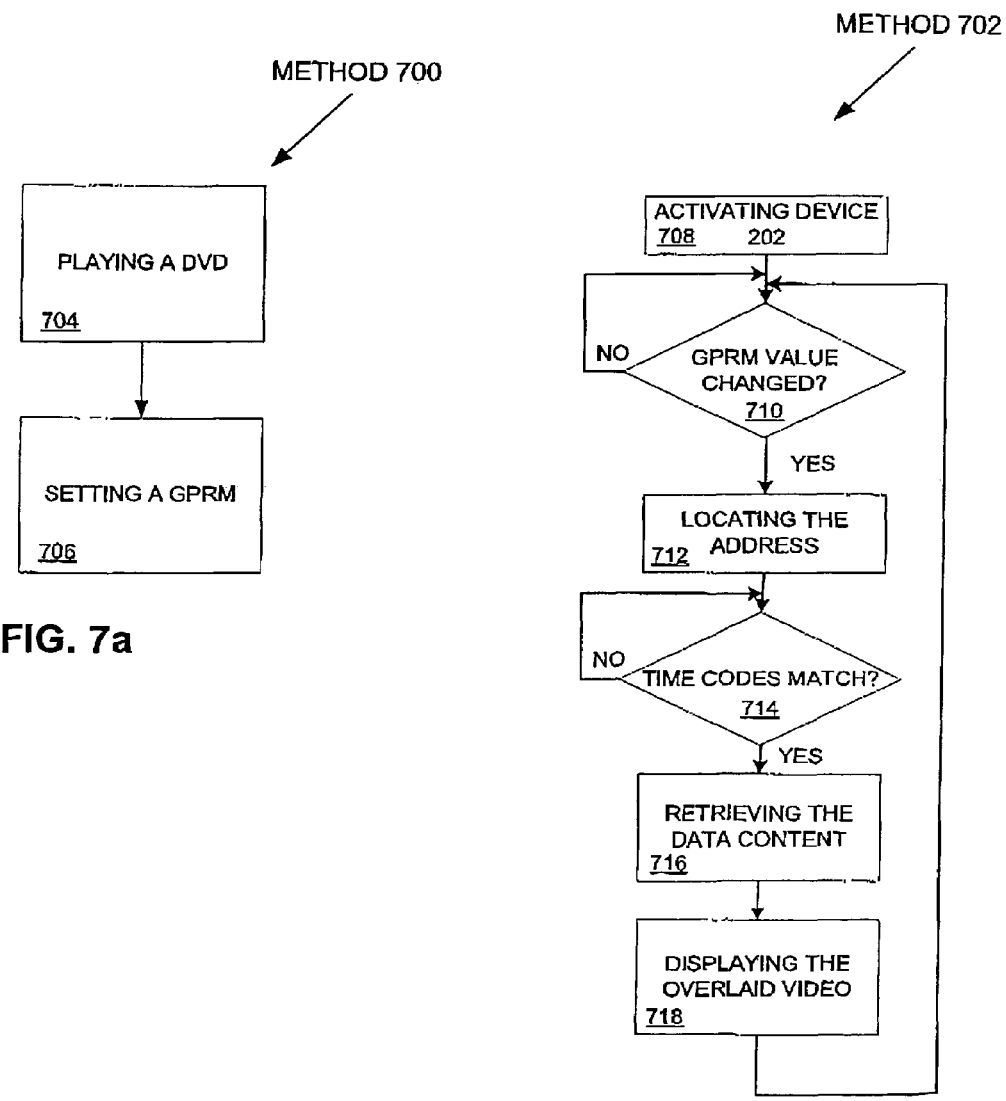
FIGS. 7a–7b are flowcharts illustrating methods for integrating this video content from a DVD being played by multimedia drive 502 and data content from storage memory 306, according to embodiments of the present invention.

FIGS. 7*a*–7*b* are flowcharts illustrating methods for integrating this video content from a DVD being played by multimedia drive 502 and data content from storage memory 506, according to embodiments of the present invention. In an embodiment, method 700 of FIG. 7*a* is embodied as a machine-readable medium located within multimedia drive 502, which is executed within a multimedia controller of multimedia drive 502. Additionally, in an embodiment, method 702 of FIG. 7*b* is embodied as a machine-readable medium-readable medium located within memory 510 and/or processor 510, which is executed within processor 510.

In particular, FIG. 7*a* illustrates method 700, which commences with multimedia drive 502 playing a DVD located therein, at block 704. A given pre-command sequence or a post-command sequence among the units of data, which is executed through the playing of the DVD, sets a GPRM data register to a particular register value at block 706. This particular register value serves as an indicator of what data content from storage memory 506 as well as when such content should be displayed on video display 504 of device 202, which is more fully described below. In particular, as multimedia drive 502 is playing the units of data within the DVD therein, multimedia drive 502 encounters a pre-command sequence prior to a particular unit of data as well as a post-command sequence subsequent to a particular unit of data. Accordingly, multimedia drive 502 executes a pre-command sequence prior to playing a given unit of data and executes a post-command sequence subsequent to playing the given unit of data. Moreover, certain of these command sequences include a command to set one of the GRPM data registers.

FIG. 7*b* illustrates method 702, which is a separate process from the process illustrated by method 700. Method 702 commences when device 202 is activated through, for example, user input, at block 708. Subsequent to activation, this process recursively monitors this GPRM data register of multimedia drive 502 to determine whether the register value there has been updated, at decision block 710. In other words, the process checks to see if the register value is different when compared to the previous time that the process checked the GPRM data register.

If this register value has not been modified, the register value of the GPRM data register is checked again, at decision block 710. In one embodiment, this recursive monitoring is performed every ¼ of a second. If this register value has been updated, this process locates this register value in a data structure, at block 712. In one embodiment, such a data structure is a list. In another embodiment, this data structure is a table. However, embodiments of the present invention are not so limited, as this data structure can be other types of structures capable of storing the data described below.

Table 2 illustrates an example of this data structure in a table format. In particular, Table 2 includes a table of register values, associated addresses and associated time codes, which are stored within memory 512 of devices 202, according to embodiments of the present invention.

TABLE 2

| GPRM Value | Address | Time Code |
|---|---|---|
| 3 | http://www.screenshot1.com | 800 |
| 4 | http://www.screenshot2.com | 1000 |
| 5 | http://www.screenshot3.com | 15 |
| 7 | http://www.screenshot4.com | 5000 |

As illustrated, Table 2 includes a column for a GPRM register value, an associated address and an associated time code. In the embodiment illustrated in Table 2, the address is a URL address. However, embodiments of the present invention are not so limited, as other types of addressing schemes may be used in conjunction with embodiments of the present invention. For example, a number-type addressing scheme could be employed.

The addresses stored in Table 2 correspond to data content stored in storage memory 506. In one embodiment, the data content stored in storage memory 506 is HTML content. In one such embodiment, the data content stored in storage memory 506 can include web pages from various Internet web sites. Moreover, such data content can include product information about a product being displayed by the video content from the DVD. As another example, this data content can include promotional information for a sale on a product for a limited duration in order, for example, to move stagnant inventory from the store where device 202 is located. Accordingly, server 204 can download different data content to different devices 202 to meet a store's specific needs. Additionally, these data content can include ordering information, such as a web page, which allows a user to enter shipping information, credit card number for billing, etc.

With regard to the time code, its value is a position within the video content stored on the DVD. The time code value is employed to synchronize the data content from storage memory 506 with the video content from the DVD being played in multimedia drive 502.

Upon locating the register value in the table of register values, the time code associated with the retrieved register value is compared to the current time code from the DVD being played in multimedia drive 502 to determine if the two time codes match, at block 714. If the time codes do not match, the process continues checking for a match between the two time codes, at block 714. If the time codes do match and the value stored in the GPRM data register has not been modified since the last change in this register value, the process retrieves the data content related to the address from storage memory 506 of device 202, at block 716. The retrieved data content is then overlaid onto the video content being displayed on video display 504 at the matched time code at block 718. This overlaying of the data content onto the video content is described in further detail in co-filed/co-pending application, titled "Method and Apparatus for Overlaying HTML Content over Video Content" to Jason Goldberg and Tim Fredenburg, which is hereby incorporated by reference.

In an alternative embodiment to blocks 710–714, the GPRM register values and the associated time codes illustrated in Table 2 are concatenated to form a single lookup value. In particular, for each entry (i.e., row) of Table 2, there is a concatenated lookup value. In one such embodiment, these concatenated values are stored in an associative cache, such as a hardware lookup table. Accordingly, once the process determines that the GPRM register value has changed and that the associated time code matches the current time code based on these concatenated values, a lookup is performed into a table, such as illustrated in Table 2 to determine the associated address. Subsequently, the process retrieves the data content from storage memory 506 at process block 716, as described above.

Upon displaying the data content overlaid onto the video content, the process returns to decision block 710 to determine if the GPRM value has changed to allow for the integration of additional data content from storage memory 506 onto portions of the video content from the DVD being played by multimedia drive 502, thereby providing a recursive process of integration of data content with video content for display.

Moreover, the elements of this data structure that includes the GPRM data register values, the addresses and the time codes can be updated by servers 204a–i, as described above in the system embodiments. Accordingly, the GPRM data register values, the addresses and the time codes can be updated from remote locations over a communication network without creating a new multimedia disc each time a change in the data content or its synchronization with the video content from the multimedia disc is required. Therefore, embodiments of the present invention provide for the local storage of high-bandwidth multimedia data within devices 202, while also providing the latest registration, ordering, promotional and/or other relevant product data from remote locations to be integrated into such high-bandwidth multimedia data.

Dynamic Control Mode Modification

In an embodiment, the control mode of device 202 can be dynamically modified. In one such embodiment, device 202 includes two control modes: (1) active video mode and (2) active text mode. The control mode of device 202 dictates which process executing on processor 510 controls the operation of device 202. For example, the process in control receives and processes the different user inputs of device 202. In one embodiment, the active text mode is employed during a more static mode of device 202. Examples of a static mode include when device 202 is employed to receive user inputs regarding the inputting of alphanumeric data from a keyboard entered by the user. For example, in an embodiment of the active text mode, e-commerce transactions are made, thereby allowing the user to enter data such as the user's name, address, credit card number, etc. Moreover, in one embodiment, the active video mode is employed during the display of graphics-intensive data, such as when there is fast changing video content being displayed on video display 504 of device 202.

In an embodiment, scripts or markup language tags, which are included in the markup language content stored in storage memory 506, set and change the control mode, which is described in further detail below. In one embodiment, these scripts or markup language tags are J-scripts. In particular, FIGS. 8a–8b are flowcharts illustrating methods for the setting and changing of the control mode, according to embodiments of the present invention.

FIG. 8a illustrates method 800, which describes control mode switching that begins in the active video mode and switches to the active text mode. In particular, method 800 commences with the initialization of device 202 in an active video mode, at block 802. Accordingly, content manager 637 controls the operation of device 202, at block 804. The control of device 202 by content manager 637 includes the receipt of the user inputs from the various input components of device 202 and acting on such inputs. Examples of various input components have been described above in conjunction with FIG. 4.

Assuming that device 202 is displaying a multiple-choice type question, such a question can be answered by a user via buttons 406 coupled to device 202. For example, one question may be what age group the user is in. The answering of this question allows the presentation being displayed in video display 504 to be tailored to that age group. Answering such a question allows multimedia drive 502 to jump to different video and text presentations based on the user's age group. For example, if device 202 has been set up for a vendor of vitamins and other health-related products, different types of information related to the user's health needs would be presented depending on the age group of the user. Therefore, different video content from multimedia drive 502 and/or data content from storage memory 506 are displayed during the subsequent presentation based on the user's age group. Accordingly, once the user of device 202 presses one of buttons 406 to answer the question, because device 202 is in active video mode, content manager 637 receives and processes this input.

Moreover, when in the active video mode, typical multimedia controls for multimedia drive 502 (e.g., timing, user input, etc) may be used for jumping between different video sequences. In addition, the synchronizing techniques previously described can be used to feed back into the control of multimedia device 502 (e.g., while remaining in the video control mode, this feed back information may be used to cause multimedia device 502 to jump to a different video sequence).

Additionally, even though content manager 637 receives all of the user inputs from the input components of device 202, content manager 637 may not necessarily process such inputs during given times of activation of device 202. For example, during a current session with a given user, another user may cause the activation of motion sensor 402, thereby causing content manager 637 to receive a user input from the motion sensor. However, instead of processing such input, content manager 637 would drop this input to preclude the interruption of the current presentation, because in one embodiment motion sensor input causes the activation of device 202, which in turns starts the presentation at the beginning. Therefore, a given process of device 202 receives the user inputs depending on which control mode device 202 is in. However, the process receiving the user inputs may not necessarily process such inputs, depending on the type of user input as well as the timing of such input.

As previously described, command sequences of the DVD being played in device 202 cause the retrieval and display of data content in synchronization with the video content from the DVD. In one such embodiment, this data content is markup language content, which includes scripts. Moreover in one embodiment, such scripts are employed to change the control mode. In other words, these scripts are used to cause a different process executing in device 202 to control device 202. Accordingly, when multimedia drive 502 executes a given command sequence that causes the loading of markup language content from storage memory 506, the markup language content is displayed on video display 504, at block 806. Additionally, assuming that this given markup language content includes scripts that change the control mode, which, in an embodiment, is an active text mode, the control mode is changed from the active video mode to the active text mode at block 808. Accordingly, a different process, browser application 638, controls device 202. Similar to control by content manager 637, this control of device 202 by browser application 638 includes the receipt and processing of the user inputs from the input components of device 202.

Embodiments of the present invention were described in terms of executing a script that is included in markup language content to be displayed on video display 504. However, embodiments of the present invention are not so limited, as the markup language content is not necessarily displayed on video display 504 or such content may be displayed as a hidden feature which does not modify video display 504.

FIG. 8b illustrates method 820, which describes control mode switching that begins in the active text mode and switches to the active video mode. In particular, method 820 commences with the initialization of device 202 in an active text mode, at block 822. Accordingly, browser application 638 controls the operation of device 202, at block 824. The control of device 202 by browser application 638 includes the receipt of the user inputs from the various input components of device 202 and acting on such inputs. For example, in an embodiment of the active text mode, e-commerce transaction are made, thereby allowing the user to enter data such as the user's name, address, credit card number, etc. Accordingly, browser application 638 receives this data and stores such data until the data is subsequently uploaded to the related server.

In addition to receiving the user inputs of device 202 as described by content manager 637, browser application 638 also control multimedia drive 502. In one such embodiment, browser application 638 controls multimedia drive 502 concerning the display of certain video portions on the multimedia disc in multimedia drive 502. Moreover, at block 826, browser application 638 loads HTML content from storage memory 506, which is integrated with the video. For example, if an HTML page is being displayed related to the specific attributes of a vitamin, browser application 638 can issue a command to multimedia drive 502 to display video of a spinning vitamin bottle. Such integration would display the spinning vitamin bottle in the background while displaying the attributes of the vitamin in the foreground.

Moreover, upon loading HTML content that includes scripts that modify the control mode, such control mode is changed from the active text mode to the active video mode at block 828. Methods 800 and 802 have described one change in the control mode of device 202. However, embodiments of the present invention are not so limited as different scripts are able to cause the continued switching between the two different control modes.

Accordingly, by loading different HTML content for display, the scripts associated with such HTML content can modify the control between the active video mode and the active text mode. Moreover, the HTML content along with the associated scripts can be updated by servers 204a–i, as described above in the system embodiments. Therefore, such content can be updated from remote locations over a communications network without creating a new multimedia disc each time a change in such content is required. For example, if a modification in the setting and changing of the control mode needs to be performed, a new HTML page with a different script can be downloaded into device 202. Therefore, when this new HTML page is displayed, a different script is executed.

Moreover, the incorporation of multiple control modes into device 202 allows for easier design and development of the hardware and software of such a device. In particular, device 202 includes the generation of multimedia content controlled by multimedia drive 502 and data content controlled by a different process executing on processor 510. The design and development of device 202 is thus partially segregated in their environments. In particular, a first design team fluent in multimedia content development can more easily design and develop the generation of multimedia content within their own control mode. Similarly, a second design team fluent in data content development, such as HTML development, can more easily design and develop the generation of data content with their own control mode. Further, the design of device 202 allows for a fluid integration between the different control modes.

Memory 512 includes a machine-readable medium on which is stored a set of instructions (i.e., software) embodying any one, or all, of the methodologies described above. Software can reside, completely or at least partially, within memory 512 and/or within processing unit 410. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. For example, embodiments of the present invention can operate independent of other embodiments.

In particular, embodiments of the present invention that include a time code in order to sync the video content from multimedia drive 502 with the data content from storage memory 506 can be incorporated into other synchronization techniques than those described herein. In other words, the time code can be matched based on other synchronization indications than those disclosed above (e.g., the value of the GPRM data register changing). For example, the time code from the multimedia disc could be employed into a system that synchronizes the video content and the data content based on the sector numbers of the multimedia disc, as described above. Moreover, this time code from the multimedia disc could be employed into a system that synchronizes based on the addresses of data content stored in the text sections of the multimedia disc.

Additionally, embodiments of the table for synchronization (e.g., Table 2) can be employed with other synchronization techniques than those described herein. For example, such a table could be incorporated into a system that synchronizes the video content and the data content based on the sector numbers of the multimedia disc. Further, this table could be employed into a system wherein the command to change the GPRM data value is stored in the text sections of the multimedia disc. Moreover, these alternative embodiments of the time code and the table together could be employed in other synchronization techniques.

In further illustration of the independence of the embodiments described herein, in one embodiment, the GPRM data value may be employed to provide for dynamic control mode modification, while not being used to synchronize the video content and the data content. Additionally, in an embodiment, the synchronization of the video content with the data content using the GPRM registers can be incorporated into other synchronizations schemes that do not employ a time code and/or a table.

Moreover, the embodiments for dynamic control mode modification may or may not be employed into the various embodiments of the synchronization described herein, as other synchronization techniques may be used in conjunction with embodiments for dynamic control mode modification. Further in other embodiments, the embodiments for dynamic control mode modification are not used in conjunction with any type of synchronization techniques. Accordingly, embodiments of the present invention can be modified such that individual embodiments can act independent of the other embodiments and/or be intermixed in various combinations without departing from the spirit and scope of the present invention. Moreover, the specification and drawings are to be regarded in an illustrative rather than a restrictive sense.

What is claimed is:

1. A method comprising:
monitoring a value of a register of a digital storage drive, the digital storage drive having a fixed storage media located therein, the fixed storage media including video content and a command sequence associated with the video content, wherein when the fixed storage media is played by the digital storage drive, the command sequence is executed to set the value of the register of the digital storage drive;
locating the value in a table of register values, upon determining that the value has changed, wherein the table includes a plurality of table entries, each table entry including a register value, an associated address and an associated time code, wherein each time code corresponds to a position within the video content, wherein the table is stored in memory of the digital storage drive and capable of being updated on the drive through a communications network;
locating data content based on the address associated with the value of the register, wherein the data content is downloaded markup language text;
integrating the data content with the video content based on the time code associated with the value of the register.

2. The method of claim 1, wherein the digital storage drive is a Digital Versatile Disc DVD drive.

3. The method of claim 2, wherein the register is a General Program register.

4. The method of claim 1, wherein the address is a Uniform Resource Locator address.

5. A method comprising:
recursively monitoring a register value of a register of a Digital Versatile Disc (DVD) drive, the DVD drive including a DVD located therein, the DVD including video content and a command sequence associated with the video content, wherein when the DVD is played by the DVD drive, the command sequence is executed to set the value of the register of the DVD drive;
locating the register value in a table of register values, upon determining that the register value is updated, wherein the table includes a plurality of table entries, each table entry including a register value, an associated Uniform Resource Locator (URL) address and an associated time code, wherein each time code is associated with a position within the video content, wherein the table is stored in memory of the DVD drive and capable of being updated on the DVD drive through a communications network;
transmitting a request for data content based on the URL address associated with the value of the register;
receiving the data content; and
integrating the data content with the video content based on the time code associated with the register value.

6. The method of claim 5, wherein integrating the data content with the video content based on the time code associated with the register value integrating the data content with the video content upon determining that the time code associated with the register value matches a current time code of the DVD.

7. The method of claim 5, wherein integrating the data content with the video content includes overlaying the data content onto the video content.

8. The method of claim 7, wherein overlaying the data content onto the video content includes a transparent overlaying of the data content onto the video content.

9. The method of claim 5, wherein the register value is updated based on a pre-command sequence stored on the DVD.

10. The method of claim 5, wherein the register value is updated based on a post-command sequence stored on the DVD.

11. The method of claim 5, wherein the register is a general program register (GPRM) of the DVD drive.

12. The method of claim 5, wherein the data content can be dynamically updated by a server through a wireless connection.

13. A method for integrating video from a Digital Versatile Disc (DVD) with HyperText Markup Language (HTML) text, the method comprising:
playing video content, by a DVD drive, from the DVD;
setting a register in the DVD drive to a register value upon executing a pre-command sequence on the DVD, the pre-command sequence associated with the video content;
associating the register value with a time code and a Uniform Resource Locator (URL) address in a table, wherein the register value, the associated time code and the associated URL address are dynamically configurable via communication from a remote server coupled to the DVD drive.

14. The method of claim 13, wherein the communication includes a wireless communication.

15. A method for integrating video from a Digital Versatile Disc (DVD) with markup language text, the method comprising:

playing video content, by a DVD drive, from the DVD;

setting a register in the DVD drive to a register value upon executing a post-command sequence on the DVD, the post-command sequence associated with the video content;

associating the register value with a time code and a Uniform Resource Locator (URL) address in a table, wherein the register value, the associated time code and the associated URL address are dynamically configurable via communication from a remote server coupled to the DVD drive.

16. The method of claim 15, wherein the communication includes a wireless communication.

17. A method comprising:

monitoring a value of a register of a multimedia drive, the multimedia drive having a fixed storage media located therein, the fixed storage media including video content and a command sequence associated with the video content, wherein when the fixed storage media is played by the multimedia drive, the command sequence is executed to set the value of the register of the multimedia drive; and synchronizing data content from a storage memory with the video content upon determining that the value of the register has changed.

18. The method of claim 17, wherein the synchronizing of the data content includes:

locating the value in a table of register values, upon determining that the value has changed, wherein the table includes a plurality of table entries, each table entry including a register value, an associated address and an associated time code, wherein each time code corresponds to a position within the video content, wherein the table is stored in memory of the multimedia drive and capable of being updated on the multimedia drive through a communications network; and locating the data content within the storage memory based on the address associated with the value of the register.

19. The method of claim 17, wherein the multimedia drive is a Digital Versatile Disc drive.

20. The method of claim 17, wherein the address is a Uniform Resource Locator address.

21. The method of claim 17, wherein the data content is markup language text.

22. A method comprising:

locating a value of a time code in a table upon receiving a synchronization indication, the synchronization indication including a value of a register of a digital storage drive being set by execution of a command sequence stored on a fixed storage media located within the digital storage drive, wherein the table includes a plurality of table entries, each table entry including a time code and an associated address, wherein each time code corresponds to a position within video content stored on the fixed storage media, the command sequence being associated with the video content, and the table being stored in memory of the digital storage drive and capable of being updated on the drive through a communications network;

locating data content based on the associated address; and integrating the data content with the video content based on the time code.

23. The method of claim 22, wherein the data content is markup language text.

24. A device coupled to a server through a network, the device comprising:

a storage memory that includes a plurality of data content, wherein the server can update the plurality of data content through the network; and a Digital Versatile Disc (DVD) drive coupled to the storage memory, the DVD drive to play a DVD, wherein the DVD includes video content and a command sequence associated with the video content, such that a plurality of time codes are associated with positions in the video content, wherein the DVD drive includes:

a register that includes a register value set by execution of the command sequence associated with the video content; and a table having a plurality of table entries, each table entry including one of a plurality of register values, one of the plurality of time codes and an address, wherein each address is associated with one of the plurality of data content, wherein the table is capable of being updated on the DVD drive through the network.

25. The device of claim 24, wherein the device is wirelessly coupled to the network.

26. The device of claim 24, wherein the device is coupled to the server through a virtual private network within the network.

27. The device of claim 24, wherein the memory is a FLASH memory.

28. The device of claim 24, wherein the address is a Uniform Resource Locator Address.

29. A machine-readable medium that provides instructions, which when executed by a machine, cause said machine to perform operations comprising:

monitoring a value of a register of a multimedia drive, the multimedia drive having a fixed storage media located therein, the fixed storage media including video content and a command sequence associated with the video content, wherein when the fixed storage media is played by the multimedia drive, the command sequence is executed to set the value of the register of the multimedia drive;

locating the value in a table of register values, upon determining that the value has changed, wherein the table includes a plurality of table entries, each table entry including a register value, an associated address and an associated time code, wherein each time code is associated with a position within the video content, wherein the table is stored in memory of the multimedia drive and capable of being updated on the drive through a communications network;

locating data content based on the address associated with the value of the register;

integrating the data content with the video content based on the time code associated with the value of the register.

30. The machine-readable medium of claim 29, wherein the multimedia drive is a Digital Versatile Disc drive.

31. The machine-readable medium of claim 30, wherein the register is a General Program register.

32. The machine-readable medium of claim 29, wherein the address is a Uniform Resource Locator address.

33. The machine-readable medium of claim 29, wherein the data content is HyperText Markup Language text.

34. A machine-readable medium that provides instructions, which when executed by a machine, cause said machine to perform operations comprising:

recursively monitoring a register value of a register of a Digital Versatile Disc (DVD) drive, the DVD drive including a DVD located therein, the DVD including video content and a command sequence associated with the video content, wherein when the DVD is played by the DVD drive, the command sequence is executed to set the value of the register of the DVD drive;

locating the register value in a table of register values, upon determining that the register value is updated, wherein the table includes a plurality of table entries, each table entry including a register value, an associated Uniform Resource Locator (URL) address and an associated time code, wherein each time code is associated with a position within the video content, wherein the table is stored in memory of the DVD drive and capable of being updated on the DVD drive through a communications network;

transmitting a request for data content based on the URL address associated with the value of the register;

receiving the data content; and integrating the data content with the video content based on the time code associated with the register value.

35. The machine-readable medium of claim 34, wherein integrating the text with the video content based on the time code associated with the register value includes integrating the text with the video content upon determining that the time code associated with the register value matches a current time code of the DVD.

36. The machine-readable medium of claim 34, wherein integrating the data content with the video content includes overlaying the data content onto the video content.

37. The machine-readable medium of claim 34, wherein overlaying the data content onto the video content includes a transparent overlaying of the data content onto the video content.

38. A machine-readable medium that provides instructions, which when executed by a machine, cause said machine to perform operations comprising:

playing video content, by a DVD drive, from a DVD;

setting a GPRM register in the DVD drive to a value upon executing a pre-command sequence on the DVD, the pre-command sequence associated with the video content; and associating the value with a time code and a Uniform Resource Locator (URL) address in a table, wherein the value, the associated time code and the associated URL address are dynamically configurable via communication from a remote server coupled to the DVD drive.

39. The machine-readable medium of claim 38, wherein the communication includes a wireless communication.

40. A machine-readable medium having stored thereon a data structure comprising:

a first data field containing data representing a value of a register of a Digital Versatile Disc (DVD) drive, the DVD drive to play a DVD, wherein the DVD includes video content and a command sequence associated with the video content, the value of the register of the DVD drive having been set by execution of the command sequence;

a second data field containing data representing a value of an address, wherein the address is associated with data content stored in a storage memory; and a third data field containing data representing a value of a time code, wherein the time code is associated with a position within the video content.

41. The machine-readable medium of claim 40, wherein the video content and the data content are integrated.

42. The machine-readable medium of claim 40, wherein the data content is overlaid onto the video content.

43. The machine-readable medium of claim 42, wherein the data content is transparently overlaid onto the video content.

44. The machine-readable medium of claim 40, wherein the address is a Uniform Resource Locator address.

45. The machine-readable medium of claim 40, wherein the data content include markup language text.

46. A machine-readable medium that provides instructions, which when executed by a machine, cause said machine to perform operations comprising:

monitoring a value of a register of a multimedia drive, the multimedia drive having a fixed storage media located therein, the fixed storage media including video content and a command sequence associated with the video content, wherein when the fixed storage media is played by the multimedia drive, the command sequence is executed to set the value of the register of the multimedia drive; and synchronizing data content from a storage memory with the video content upon determining that the value of the register has changed.

47. The machine-readable medium of claim 46, wherein the synchronizing of the data content includes:

locating the value in a table of register values, upon determining that the value has changed, wherein the table includes a plurality of table entries, each table entry including a register value, an associated address and an associated time code, wherein each time code corresponds to a position within the video content, wherein the table is stored in memory of the multimedia drive and capable of being updated on the multimedia drive through a communications network; and locating the data content within the storage memory based on the address.

48. The machine-readable medium of claim 46, wherein the multimedia drive is a Digital Versatile Disc drive.

49. The machine-readable medium of claim 46, wherein the address is a Uniform Resource Locator address.

50. The machine-readable medium of claim 46, wherein the data content is HyperText Markup Language text.

51. A machine-readable medium that provides instructions, which when executed by a machine, cause said machine to perform operations comprising:

locating a value of a time code in a table upon receiving a synchronization indication, the synchronization indication including a value of a register of a digital storage drive being set by execution of a command sequence stored on a fixed storage media located within the digital storage drive, wherein the table includes a plurality of table entries, each table entry including a time code and an associated address, wherein each time code corresponds to a position within video content stored on the fixed storage media, the command sequence being associated with the video content, and the table being stored in memory of the digital storage drive and capable of being updated on the drive through a communications network;

locating data content based on the associated address; and integrating the data content with the video content based on the time code.

52. The machine-readable medium of claim 51, wherein the data content is markup language text.

* * * * *